Nov. 30, 1948.  E. J. WIENKE  2,455,206
TENSION SHOE MOUNTING FOR PROJECTORS
Filed Feb. 15, 1946
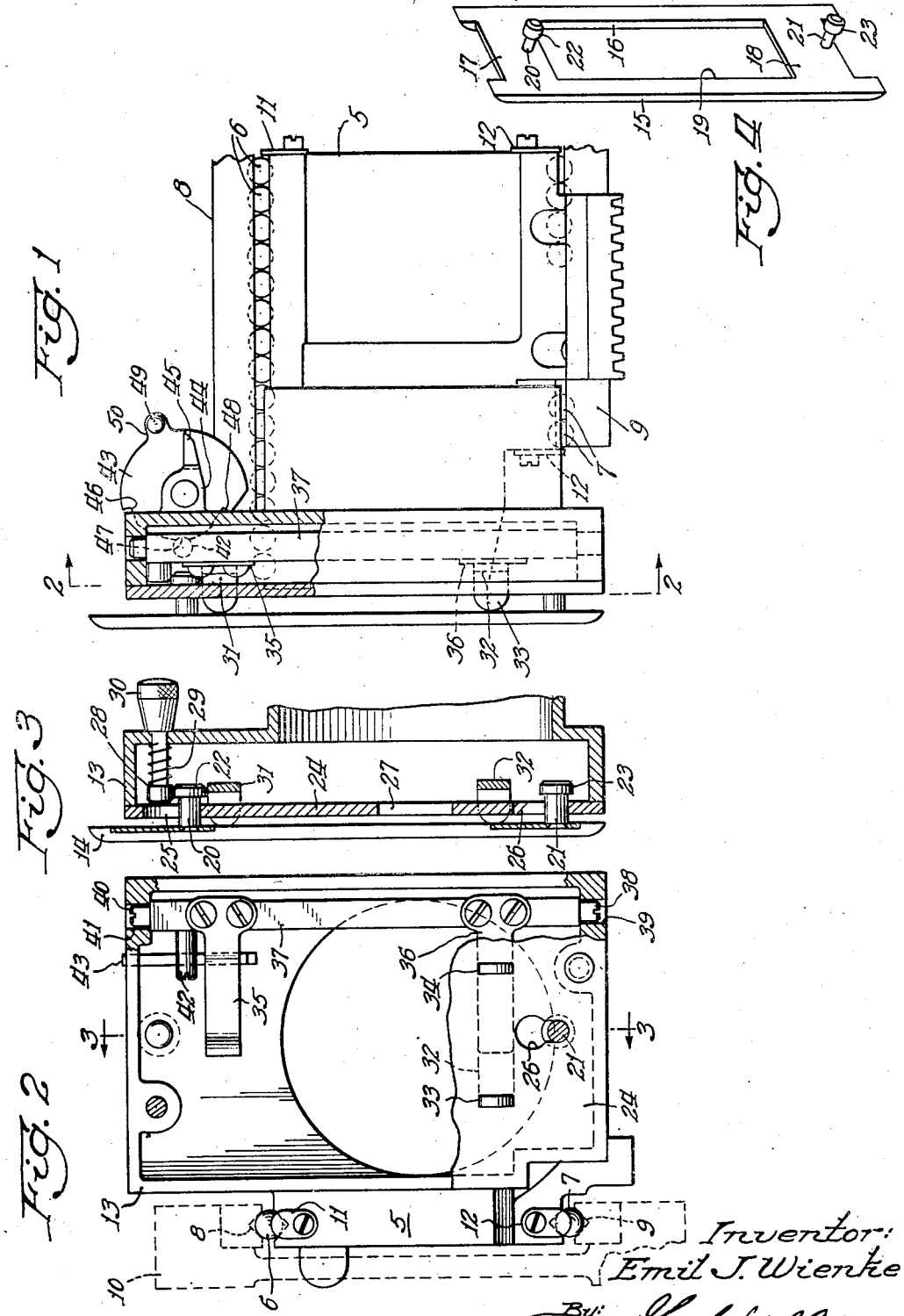
Inventor:
Emil J. Wienke Patented Nov. 30, 1948

2,455,206

UNITED STATES PATENT OFFICE 2,455,206

TENSION SHOE MOUNTING FOR PROJECTORS

Emil J. Wienke, Glen Ellyn, Ill., assignor to Motiograph, Chicago, Ill., a limited partnership Application February 15, 1946, Serial No. 647,938

4 Claims. (Cl. 88—17)

The present invention relates to motion picture projectors, and particularly to the mounting and operation of the film tension shoe which presses the film against the guides of the film aperture plate and provides the necessary frictional drag on the film. It is the principal purpose of this invention to provide a novel tension shoe support whereby the tension shoe itself may easily be given any one of a plurality of adjustments to vary the tension that is applied to the film, and the shoe itself may be readily removed at any time.

It is a further purpose of my invention to provide a film tension shoe support of the type above referred to with a novel mounting and locking means for removably locking the shoe to the support.

It is a further purpose of my invention to provide a novel spring backing construction for the film tension shoe that can be utilized to give more or less spring pressure to the shoe by a simple manual adjustment.

The nature and advantages of my invention will appear more fully from the following description and the accompanying drawings wherein a preferred form of the invention is shown. It should be understood, however, that the drawings and description are illustrative only, and should not be considered as limiting the invention except insofar as it is limited by the claims.

In the drawings:

Figure 1 is a side view partially in section of the film tension shoe support which embodies my invention, Figure 2 is a sectional view taken on the line 2—2 of Figure 1 with certain parts broken away, Figure 3 is a sectional view taken on the line 3—3 of Figure 2, and Figure 4 is a prospective view of the film tension shoe.

Referring now to the drawings, the present invention is directed to features of a film tension shoe support which forms part of the mechanism described in my pending application, Serial Number 647,937 filed February 15, 1946, for motion picture projector wherein the several parts of a motion picture projector that are concerned with the clamping of the film in position at the light aperture for the transmission of the image from the film through the projector, constitute a single unit that is mounted in the projector housing in such fashion as to be capable of extremely accurate mounting and susceptible of ready replacement of the entire unit or any one of the component parts without loss of the original accuracy of position with respect to the light axis on the projector.

The film tension shoe support comprises a bracket 5 which is movably mounted by upper and lower sets 6 and 7 of ball bearings that ride in V-shaped grooves of two guides 8 and 9 that are provided upon an assembly base 10 which is mounted in the projector housing. The ball bearings are held in place by suitable plates 11 and 12 which are carried by the bracket 5. The bracket 5 supports a frame 13 which in turn provides the support for a film tension shoe 14. The film tension shoe is shown in Figure 4 of the drawings, as comprising a rectangular frame work with two side pressure rails 15 and 16 that are adapted to engage the film and upper and lower cross pieces 17 and 18 that connect the rails. This leaves an open space 19 which is located opposite the light aperture through which light is transmitted to the film. The cross pieces 17 and 18 carry two mounting pins 20 and 21 which have enlarged heads 22 and 23 thereon, somewhat conical at their outer ends. The frame 13 has a front face plate 24 that has an upper key hole slot 25 to receive the pin 20, and a lower key hole slot 26 to receive the pin 21. This plate 24 has an aperture 27 which is aligned with the light aperture of the film guide plate. The tension shoe 14 can be inserted and removed from the plate 24 by aligning the heads 22 and 23 with the upper enlarged portions of the key hole slots 25 and 26. When the shoe is positioned as shown in Figure 3, a locking pin 28 is pressed forward by its spring 29 to extend over the head 22 of the pin 20, thus holding the tension shoe in position. In order to remove the tension shoe, the pin 28 has to be drawn back by a handle 30, after which the shoe can be lifted to align the heads 22 and 23 with the large parts of the key hole slots.

The film tension shoe is yieldingly pressed forward by means of two yokes 31 and 32. These yokes have end portions such as those indicated at 33 and 34 extending through corresponding apertures in the plate 24. The yokes are pressed forwardly by leaf springs 35 and 36. The leaf springs 35 and 36 are mounted upon the pivot pin 37, the lower end of which is pivoted by a screw 38 in an aperture 39 at the bottom of the frame 13. The upper end of the pin 37 is similarly pivoted by a screw 40 in an aperture 41 of the frame 13. In order to hold the springs 35 and 36 against the yokes 31 and 32, I provide an arm 42 on the part 37 and a cam 43 by which the arm may be pushed more or less forward, that is, toward the tension shoe to in turn swing the pin 37 and the springs 35 and 36 against the yokes with a greater or lesser pressure. It will be noted that the cam 43 is pivoted by a suitable ear 44 on the frame 13. This ear is provided with a pointer 45 to cooperate with suitable graduations provided on the cam 43. The cam has a plurality of notches 46, 47 and 48 therein located at different distances from the cam pivot so as to provide the desired adjustment. A finger piece 49 is secured to an ear 50 of the cam for operating.

The three notches 46, 47 and 48 provide a high tension of the springs 35 and 36, an intermediate or standard running tension and an extremely low tension. In some instances it is necessary to obtain a tension between the three notches, and the cam can be so shaped as to provide a different tension between these three definite stop points. It is obvious that more or less stop points can be provided within the scope of my invention.

The mounting of the tension shoe permits ready removal of it since all that is necessary to remove it is to pull back the pin 28 and then lift the shoe until the heads 22 and 23 can be pulled through the key hole slots. The attachment and removal of the tension shoe does not affect the spring adjustment in any way.

Having thus described my invention, I claim:

1. A film tension shoe mount for motion picture machines comprising a frame including a front face plate, a film tension shoe, cooperating members on the plate and shoe mounting the shoe on the plate for limited movement toward and away from the plate and limited movement of the shoe in a direction parallel to the plate, said members being separable when the shoe is moved parallel to the plate to a point near one limit of its movement parallel to the plate, and a spring pressed lock normally holding the shoe at its other limit of movement parallel to the plate.

2. A film tension shoe mount for motion picture machines comprising a frame including a front face plate, a film tension shoe, cooperating members on the plate and shoe mounting the shoe on the plate for limited movement toward and away from the plate, upper and lower yokes carried in said frame and having portions extending through the plate and engaging the shoe to press it away from the plate, leaf springs pressing on said yokes, a support for said springs pivoted in the frame, and means for turning said support on its pivots to vary the tension of said springs, said last named means comprising a pin projecting from said support and a manually adjustable cam on the frame engaging said pin.

3. A film tension shoe mount for motion picture machines comprising a frame including a front face plate, a film tension shoe, cooperating members on the plate and shoe mounting the shoe on the plate for limited movement toward and away from the plate, and means mounted in the frame for yieldingly pressing the tension shoe away from the plate, said means including spaced members projecting through the plate, spring means urging said members outward toward the shoe, a member carrying said spring means and pivoted in the frame, and means for adjusting said member on its pivot to vary the tension on said springs.

4. A film tension shoe mount for motion picture machines comprising a frame including a front face plate having a light aperture, a film tension shoe in front of said plate, cooperating members on the plate and shoe mounting the shoe on the plate for limited movement toward and away from the plate, and said plate having an upper pair of laterally spaced apertures therein above the light aperture and a lower pair of laterally spaced apertures therein below the light aperture, upper and lower yokes carried in said frame and having their free ends extending through the pairs of apertures and engaging the back of said film tension shoe to press it toward its outer limit of movement, a pin pivoted in the frame, spring arms fixed to the pin and bearing against the yokes to press them toward the shoe, an arm fixed to the pin and extending laterally from it, a cam plate pivoted on said frame and extending into the path of the pin, said cam plate having notches on its pin engaging surface for retaining the cam in fixed position.

EMIL J. WIENKE.

REFERENCES CITED

The following references are of record in the file of this patent:

UNITED STATES PATENTS

| Number | Name | Date |
| --- | --- | --- |
| 2,140,738 | Fitz | Dec. 20, 1938 |
| 2,211,826 | Kindelmann, et al. | Aug. 20, 1940 |
| 2,246,970 | Brenkert | June 24, 1941 |